Figure 1:
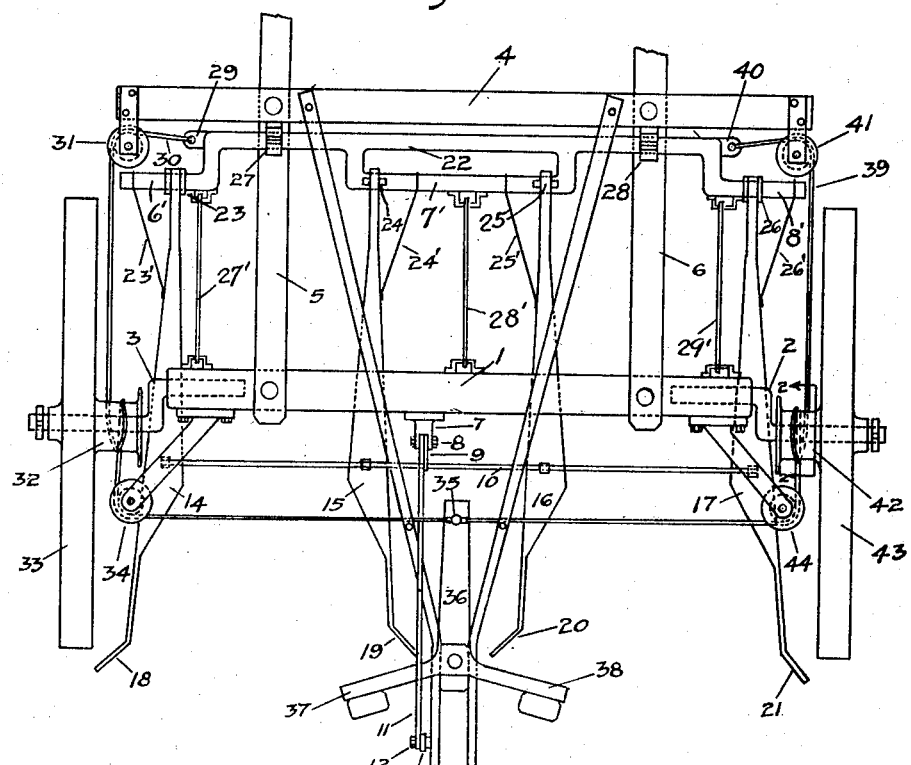

B. M. MATHIAS.
SHIFTING MECHANISM FOR CULTIVATORS.
APPLICATION FILED FEB. 18, 1918.

1,332,947.

Patented Mar. 9, 1920.

Inventor
Berton M. Mathias.
By C. D. Enochs
Attorney.

UNITED STATES PATENT OFFICE.

BERTON M. MATHIAS, OF MINNEAPOLIS, MINNESOTA.

SHIFTING MECHANISM FOR CULTIVATORS.

1,332,947.             Specification of Letters Patent.      Patented Mar. 9, 1920.

Application filed February 18, 1918. Serial No. 217,988.

*To all whom it may concern:*

Be it known that I, BERTON M. MATHIAS, a citizen of the United States, and a resident of Minneapolis, in the county of Hennepin and State of Minnesota, have invented certain new and useful Improvements in Shifting Mechanisms for Cultivators, of which the following is a specification.

One object of my invention is to provide means for shifting the shovels of cultivators and the like laterally with respect to the frame of the cultivator.

Another object of my invention is to provide power operated means for shifting cultivator shovels and the like laterally.

Another object of my invention is to provide, in a cultivator having means for raising and lowering the shovels, power operated shifting means for moving the shovels laterally with respect to the cultivator frame.

With these and incidental objects in view the invention consists of certain novel features of construction and combination of parts, the essential elements of which are hereinafter described with reference to the drawing which accompanies and forms a part of this specification.

Figure 2:
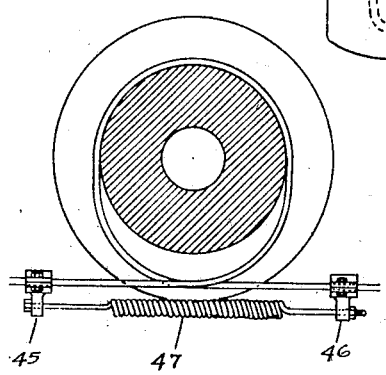
Figure 3:
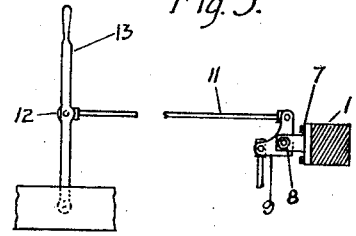

In the drawing Figure 1 is a plan view of a cultivator embodying my invention. Fig. 2 is a section taken on the line 2—2, Fig. 1, and Fig. 3 is a side view showing the shovel lifting mechanism with part of the connecting link broken away.

In the cultivator shown in Fig. 1 the frame consists of an axle 1 supporting the crank spindles 2 and 3 and connected to the front cross bar 4 by longitudinal members 5 and 6.

The hitch and the like are omitted for the sake of simplicity, as they have nothing to do with my present invention.

A support 7, carried by the axle 1, has hinged at 8 a bell crank 9 through which the rod 10 passes, and a link 11, hinged at 12 to the lever 13, provides means for raising and lowering the cross rod 10 by the motion of the lever 13.

The rod 10 is journaled in supports carried by the shovel beams 14, 15, 16 and 17 so the raising and lowering of the rod 10 will raise and lower the shovels 18, 19, 20 and 21.

The cranks 2 and 3 are mounted to turn about their respective wheel spindles so as to make the wheel spindles adjustable for height in a manner well known to those skilled in the art.

The shovel beams 14 to 17 inclusive are rotatably mounted on the crank bar 22 at points 23, 24, 25 and 26, with suitable collars or other means provided for preventing them from sliding transversely on their crank bearings.

Strap braces 23', 24', 25' and 26' are provided to stiffen the beams against transverse swinging about the points 23. Pivoted angle braces 27', 28' and 29' limit the swing of the crank wrists 6', 7' and 8' of the crank bar 22.

The crank bar 22 is slidably and rotatably mounted at 27 and 28 onto the frame of the cultivator and is so hung as to oscillate slightly in its mounting.

Fastened at 29 to the crank bar 22 is a cable 30, and this cable passes over the pulley 31, supported by the frame, passes around the drum 32 of the driving wheel 33, over the pulley 34 and is fastened at 35 to one arm of the bell crank 36, movable by foot levers 37 and 38 to the right or left as desired.

Similarly, the second cable 39 runs from the lug 40 on the crank bar 22, over the pulley 41, around the drum 42, carried by the wheel 43, over the pulley 44 to the point 35.

Where the cables pass over their respective drums, sufficient slack is provided for taking care of the varying length from the pulley 31 to the drum, brought about by the raising or lowering of the frame of the cultivator in adjusting the shovels.

To keep the slack provided at the drum so as to prevent binding on the drum, clips 45 and 46, connected by a spring 47, are carried by each cable just ahead and to the rear of its co-acting drum, as plainly shown in Fig. 2.

With the construction shown and described it is evident that with the cultivator moving forwardly, if the foot lever 37 is pressed forwardly, the slack around the drum 32 is taken up, the cable tightened on that drum, and the forward turning of the wheel 33 will shift the multiple crank 22 to the left, the power provided for moving the cultivator forwardly furnishing the power for shifting.

Similarly the crank bar is shifted to the right by pushing the foot lever 32 forwardly.

A seat 48, supported on a brace 49, is carried by the frame and the seat so positioned that ample control of the levers 37 and 38 may be obtained by the driver's foot.

While I have described my invention and illustrated it in one particular design, I do not wish it understood that I limit myself to this construction, as it is evident that the application of the invention may be varied in many ways within the scope of the following claims.

Claims:

1. In a shifting mechanism for cultivators the combination, with the frame of the cultivator, of a transverse slidable crank bar having cranks thereon, cultivator beams rotatably mounted on the wrists of said cranks but fixed as to transverse motion thereon, and means operable by a driving wheel of the cultivator for shifting said multiple crank transversely.

2. In a shifting mechanism for cultivators the combination of a cultivator frame, cultivator wheels carried by said frame on spindles, a drum on each of said wheels, a bell crank hinged on said frame, cultivator beams, means carrying the forward ends of said cultivator beams in slidable connection with said frame, and a cable extending from a point on said slidable beams and over anti-friction devices and passing around one of said drums and fastened to one end of said bell crank.

3. In a shifting mechanism for cultivators the combination of means for shifting cultivator beams, of a cable for controlling said means, a drum carried by one of the wheels of said cultivator around which said cable passes, and spring means for normally maintaining slack in said cable about said drum.

4. In a shifting mechanism for cultivators the combination of means for shifting cultivator beams, of a cable for controlling said means, a drum carried by one of the wheels of said cultivator around which said cable passes, spring means for normally maintaining slack in said cable about said drum, and means for tightening said cable about said drum.

BERTON M. MATHIAS.